United States Patent
Paone et al.

(10) Patent No.: US 10,732,931 B2
(45) Date of Patent: Aug. 4, 2020

(54) NEGATIVE OPERAND COMPATIBLE CHARGE-SCALING SUBTRACTOR CIRCUIT

(71) Applicant: International Business Machines Corporation, Armonk, NY (US)

(72) Inventors: Phil Paone, Rochester, NY (US); David Paulsen, Inver Grove Heights, MN (US); George Paulik, Rochester, MN (US); John E. Sheets, II, Zumbrota, MN (US); Karl Erickson, Rochester, MN (US); Gregory J. Uhlmann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 16/202,310

(22) Filed: Nov. 28, 2018

(65) Prior Publication Data

US 2020/0167126 A1  May 28, 2020

(51) Int. Cl.
   *G06F 7/50* (2006.01)

(52) U.S. Cl.
   CPC ....................... *G06F 7/50* (2013.01)

(58) Field of Classification Search
   None
   See application file for complete search history.

(56) References Cited

U.S. PATENT DOCUMENTS 6,346,855 B1 * 2/2002 Seevinck ............ H03F 3/45085
                                                              330/252
6,967,611 B2 11/2005 Atriss et al.
(Continued)

FOREIGN PATENT DOCUMENTS

| CN | 107247190 A | 10/2017 |
|---|---|---|
| JP | 5802001 B2 | 10/2015 |
| WO | 2014072391 A1 | 5/2014 |

OTHER PUBLICATIONS

Paulsen et al., "Charge-Scaling Subtractor Circuit", U.S. Appl. No. 16/408,881, filed May 10, 2019.
(Continued)

*Primary Examiner* — Michael D. Yaary
(74) *Attorney, Agent, or Firm* — Nathan M. Rau

(57) ABSTRACT

A negative-operand compatible subtractor circuit can be fabricated within an integrated circuit (IC) and can be configured to draw a difference output node to a voltage proportional to a difference between two received N-bit binary numbers. The subtractor circuit includes two sets of N inputs that receive N-bit binary numbers, each set of N inputs indexed by an integer bit number "n." The subtractor circuit includes two sets of scaled capacitors, each capacitor of two sets of scaled capacitors electrically connected to the difference output node. Each scaled capacitor has a capacitance equal to $2^{(n)}$*a unit capacitance ($C_{UNIT}$). The subtractor circuit includes a reset circuit configured to draw, in response to a received RESET signal, the difference output node to ground. A control circuit of the subtractor is configured to, in conjunction with the reset circuit, draw the difference output node to a reset voltage.

20 Claims, 5 Drawing Sheets

(56) References Cited

U.S. PATENT DOCUMENTS

| | | | |
|---|---|---|---|
| 7,042,284 B2* | 5/2006 | Moons | H03F 1/02 330/124 R |
| 7,102,557 B1 | 9/2006 | Frith | |
| 7,268,718 B1 | 9/2007 | Wu | |
| 7,280,058 B1 | 10/2007 | Zhu et al. | |
| 7,332,933 B2 | 2/2008 | Kim et al. | |
| 7,336,126 B2 | 2/2008 | Donig | |
| 7,460,046 B2 | 12/2008 | Di Giandomenico et al. | |
| 7,786,917 B2 | 8/2010 | Hu et al. | |
| 7,936,299 B2 | 5/2011 | Astley et al. | |
| 8,823,572 B2 | 9/2014 | Lemkin | |
| 9,054,733 B2 | 6/2015 | Quiquempoix et al. | |
| 9,069,995 B1 | 6/2015 | Cronie | |
| 9,071,265 B1 | 6/2015 | Dey et al. | |
| 9,214,912 B2 | 12/2015 | Lee | |
| 9,297,911 B2 | 3/2016 | Rostaing et al. | |
| 9,312,831 B2 | 4/2016 | Nestler et al. | |
| 9,602,119 B1 | 3/2017 | Maulik et al. | |
| 9,609,259 B1 | 3/2017 | Tiew | |
| 9,904,512 B1 | 2/2018 | Pasca | |
| 2001/0000661 A1 | 5/2001 | Miyamoto | |
| 2009/0201051 A1 | 8/2009 | Ono et al. | |
| 2014/0247177 A1 | 9/2014 | Draxelmayr | |

OTHER PUBLICATIONS

Paulsen et al., "Charge-Scaling Adder Circuit", U.S. Appl. No. 16/16408,808 filed May 10, 2019.

List of IBM Patents or Patent Applications Treated as Related, Signed May 10, 2019, 2 pages.

Alaghi et al., "The Promise and Challenge of Stochastic Computing", IEEE Transactions on Computer-Aided Design of Integrated Circuits and Systems, (c) 2017 IEEE, 19 pages.

Minaei et al., "Memstor, memstance simulations via a versatile 4-port built with new adder and subtractor circuits", International Journal of Electronics, vol. 102, 2015—Issue 6, Abstract Only, 5 pages.

Unknown, "EE247—Lecture 14", Data Converters—DAC Design, 34 pages, Copyright 2009 https://inst.eecs.berkeley.edu/%7Eee247/fa09/files07/lectures/L14_2_f09.pdf.

Anonymous, "One Step Carry Adder", An IP.com Prior Art Database Technical Disclosure, IP.com No. IPCOM000008303D, IP.com Electronic Publication Date: Jun. 4, 2002, 5 pages.

IBM, "Method of Data Addition in Bit-Position-Coding Data Format", An IP.com Prior Art Database Technical Disclosure, IP.com No. IPCOM000182330D, IP.com Electronic Publication Date: Apr. 27, 2009, 13 pages.

Anonymous, "A Device and Method for Eliminating Redundant Hardware by Utilizing a Vectorized Fixed Point Multiplier", An IP.com Prior Art Database Technical Disclosure, IP.com No. IPCOM000239274D, IP.com Electronic Publication Date: Oct. 24, 2014, 7 pages.

Thakur et al., "Low-Power Architectures and Self-Calibration Techniques of DAC for SAR-ADC implementation", International Journal of Innovative Research in Electrical, Electronics, Instrumentation and Control Engineering, vol. 2, Issue 3, Mar. 2014, 4 pages.

Paulsen et al., "Charge-Scaling Adder Circuit", U.S. Appl. No. 16/018,108, filed Jun. 26, 2018.

Paulsen et al., "Charge-Scaling Subtractor Circuit", U.S. Appl. No. 16/018,113, filed Jun. 26, 2018.

IBM, List of IBM Patents or Patent Applications Treated as Related, Nov. 28, 2018, 2 pages.

* cited by examiner

US 10,732,931 B2

NEGATIVE OPERAND COMPATIBLE CHARGE-SCALING SUBTRACTOR CIRCUIT

BACKGROUND

The present disclosure generally relates to integrated circuits (ICs). In particular, this disclosure relates to a charge-scaling subtractor circuit used to perform rapid subtraction operations on binary numbers within an IC.

An IC, also known as a "microchip," silicon or computer "chip," is a specially prepared piece of silicon, or other semiconductor material, into which a complex electronic circuit is etched and formed using a photolithographic process. IC types can include computer processors, memory, analog, and customizable devices. ICs can be relatively fragile, and therefore are often mounted on and/or surrounded by a protective, supportive ceramic or plastic package. Electrical connections to the chip can be provided through metal contacts, which can include pins or solder balls located on the exterior of the chip package.

ICs can have certain advantages over comparable discrete circuits, such as relatively low-cost and high-performance. The cost of an IC can be relatively low, resulting from the large number, e.g., millions, of transistors that can be simultaneously printed as a complete functional unit by photolithographic techniques, rather than constructing an equivalent circuit from individually fabricated transistors. Performance of an IC can be significantly higher than an equivalent discrete circuit, due to the high density and relatively low electrical interconnect parasitics between active devices such as transistors. Types of ICs may include analog, digital and "mixed signal" chips, i.e., chips that incorporate both analog and digital functions on the same silicon die.

A capacitor is a passive electrical component having at least two electrical conductors known as plates, separated by a dielectric or insulator, and which may be used to electrostatically store energy in an electric field. Capacitors may be useful as circuit elements in conjunction with a variety of types of electronic devices such as digital and analog ICs.

SUMMARY

Embodiments may be directed towards a subtractor circuit fabricated within an integrated circuit (IC). The subtractor circuit can be configured to draw, using charge-scaling circuitry, a difference output node to a voltage proportional to a sum of two received N-bit binary numbers. The subtractor circuit can include a first set of N inputs configured to receive a first binary number having N bits. Each input of the first set of N inputs is indexed by an integer bit number "n" that corresponds to each input's respective significance, where n is in a range between and including 0 and N−1. The subtractor circuit can also include a first sign input configured to receive a first sign bit corresponding to a sign of the first binary number. The subtractor circuit can also include a first set of scaled capacitors that includes a true capacitor and a complement capacitor corresponding to each respective bit number n of the first binary number. Each capacitor of the first set of scaled capacitors has an output terminal electrically connected to a difference output node and further has a capacitance value equal to $2^{(n)}*$a unit capacitance value ($C_{UNIT}$). The subtractor circuit can also include a second set of N inputs configured to receive a second binary number having N bits. Each input of the second set of N inputs is indexed by an integer bit number "n" that corresponds to each input's respective significance, where n is in a range between and including 0 and N−1. The subtractor circuit can also include a second sign input configured to receive a second sign bit corresponding to a sign of the second binary number. The subtractor circuit can also include a second set of scaled capacitors that includes a true capacitor and a complement capacitor corresponding to each respective bit number n of the second binary number. Each capacitor of the second set of scaled capacitors has an output terminal electrically connected to a difference output node and further having a capacitance value equal to $2^{(n)}*C_{UNIT}$. The subtractor circuit can also include a control circuit electrically coupled to the first and second sets of N inputs and to the first and second sign inputs. The control circuit can be configured to drive, in accordance with values of the N bits of the first binary number and a value of the first sign bit, input terminals of true capacitors and of complement capacitors of the first set of scaled capacitors to a first set of voltages representing a value of the first binary number. The control circuit can be also configured to drive, in accordance with values of the N bits of the second binary number and a value of the second sign bit, input terminals of true capacitors and of complement capacitors of the second set of scaled capacitors to a second set of voltages representing a value of the second binary number. The subtractor circuit can also include a reset circuit electrically connected to ground and to the difference output node, the reset circuit configured to draw, in conjunction with the control circuit and in response to receiving a RESET signal, the difference output node to a reset voltage.

Embodiments may be directed towards a method of operating a subtractor circuit that uses charge-scaling to subtract, from a first N-bit binary number, a second N-bit binary number. The subtractor circuit can be fabricated within an IC. The subtractor circuit can include a first set and a second set of N binary number inputs and first and second sign inputs corresponding to the first and the second set of N binary number inputs, respectively. The subtractor circuit can also include a set of true scaled capacitors and a set of complement scaled capacitors where output terminals of the set of true scaled capacitors and of the set of complement scaled capacitors are electrically connected to a difference output node. The subtractor circuit can also include a reset circuit configured to receive a reset input, the reset circuit electrically connected to the difference output node. The method can include resetting the subtractor circuit. Resetting the subtractor circuit can include drawing, in response the first set and the second set of N binary number inputs and the first and second sign inputs each being asserted to a logical "0" value, input terminals of the sets of true and complement scaled capacitors to ground. Resetting the subtractor circuit can also include drawing, in response to a reset input, the difference output node to ground with the reset circuit. Resetting the subtractor circuit can also include drawing, with the reset circuit in response to the first sign input and the second set of N binary number inputs each being asserted to a logical "1", the difference output node to a reset voltage. The method can include receiving, with the first set of N binary number inputs, a first N-bit binary number and receiving, with a second set of N inputs, a second N-bit binary number. The method can include drawing, in response to the values of the first and of the second N-bit binary numbers, with the set of true scaled capacitors and with the set of complement scaled capacitors, the difference output node to an output voltage proportional to a sum of the first and second N-bit binary numbers.

Embodiments may be directed towards a design structure embodied on a non-transitory computer-readable storage medium readable by a machine used in design, manufacture, and simulation of an IC subtractor circuit, the design structure comprising elements that, when processed in a semiconductor manufacturing facility, produce an IC including a subtractor circuit. The subtractor circuit can include a first set of N inputs configured to receive a first binary number having N bits. Each input of the first set of N inputs is indexed by an integer bit number "n" that corresponds to each input's respective significance, where n is in a range between and including 0 and N−1. The subtractor circuit can also include a first sign input configured to receive a first sign bit corresponding to a sign of the first binary number. The subtractor circuit can also include a first set of scaled capacitors that includes a true capacitor and a complement capacitor corresponding to each respective bit number n of the first binary number. Each capacitor of the first set of scaled capacitors has an output terminal electrically connected to a difference output node and further has a capacitance value equal to $2^{(n)}*C_{UNIT}$. The subtractor circuit can also include a second set of N inputs configured to receive a second binary number having N bits. Each input of the second set of N inputs is indexed by an integer bit number "n" that corresponds to each input's respective significance, where n is in a range between and including 0 and N−1. The subtractor circuit can also include a second sign input configured to receive a second sign bit corresponding to a sign of the second binary number. The subtractor circuit can also include a second set of scaled capacitors that includes a true capacitor and a complement capacitor corresponding to each respective bit number n of the second binary number. Each capacitor of the second set of scaled capacitors has an output terminal electrically connected to a difference output node and further having a capacitance value equal to $2^{(n)}*C_{UNIT}$. The subtractor circuit can also include a control circuit electrically coupled to the first and second sets of N inputs and to the first and second sign inputs. The control circuit can be configured to drive, in accordance with values of the N bits of the first binary number and a value of the first sign bit, input terminals of true capacitors and of complement capacitors of the first set of scaled capacitors to a first set of voltages representing a value of the first binary number. The control circuit can be also configured to drive, in accordance with values of the N bits of the second binary number and a value of the second sign bit, input terminals of true capacitors and of complement capacitors of the second set of scaled capacitors to a second set of voltages representing a value of the second binary number. The subtractor circuit can also include a reset circuit electrically connected to ground and to the difference output node, the reset circuit configured to draw, in conjunction with the control circuit and in response to receiving a RESET signal, the difference output node to a reset voltage.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
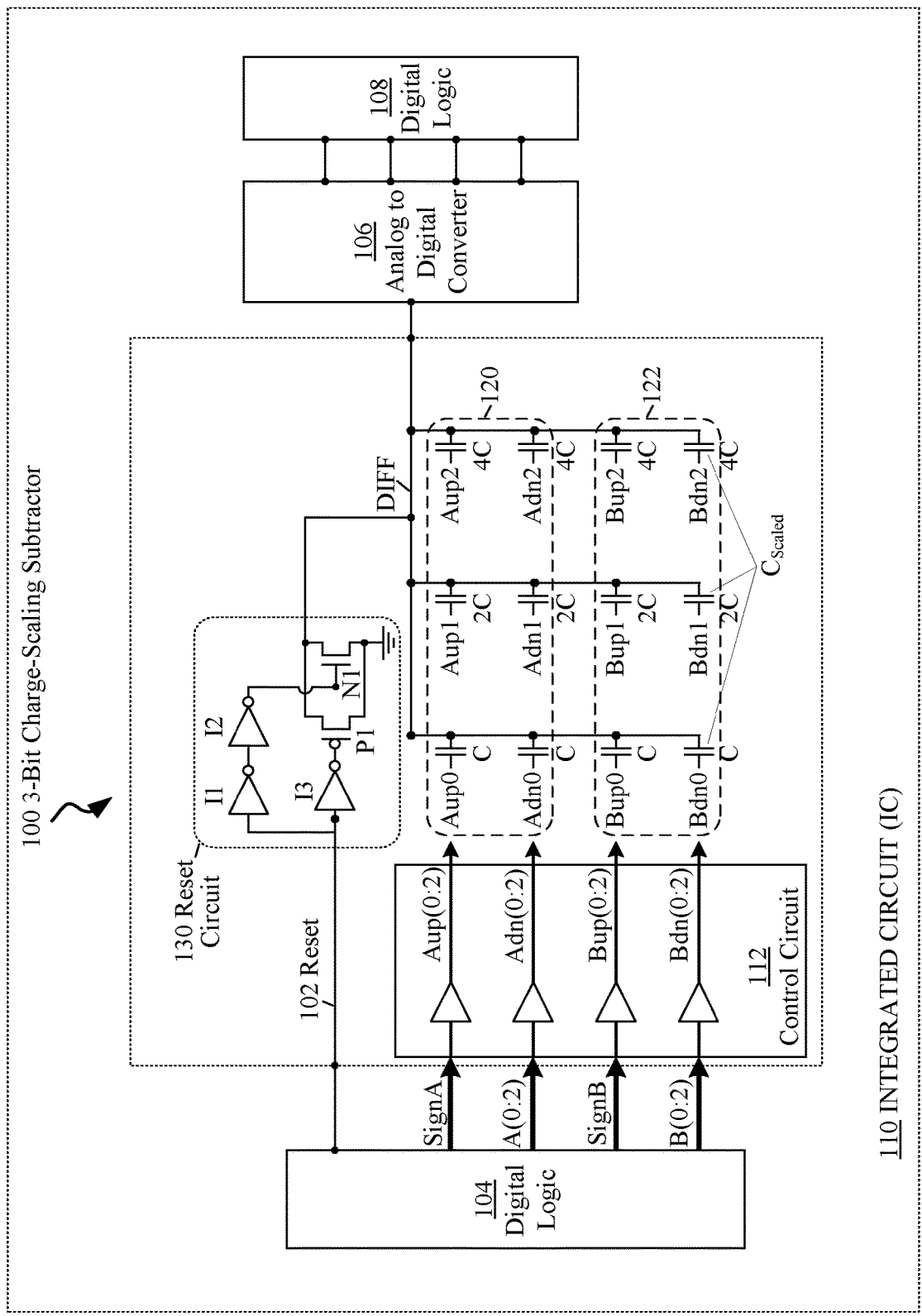
FIG. 1 includes a schematic depiction of a 3-bit charge-scaling subtractor circuit within an integrated circuit (IC), according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

Certain embodiments of the present disclosure can be appreciated in the context of providing, through the use of a charge-scaling subtractor circuit, rapid subtraction of binary numbers, for electronic equipment such as processor integrated circuits (ICs). Such processor ICs may be used to provide computational capabilities to electronic equipment such as servers. Such servers may include, but are not limited to web servers, application servers, mail servers, and virtual servers. While not necessarily limited thereto, embodiments discussed in this context can facilitate an understanding of various aspects of the disclosure. Certain embodiments may also be directed towards other equipment and associated applications, such as providing rapid subtraction of binary numbers for ICs used in electronic equipment such as computing systems, which may be used in a wide variety of computational and data processing applications. Such computing systems may include, but are not limited to, supercomputers, high-performance computing (HPC) systems, and other types of special-purpose computers. Embodiments may also be directed towards providing rapid subtraction of binary numbers for ICs used in consumer and small office/home office (SOHO) electronic equipment such as personal computers, laptops, mobile and network server devices.

Individual bits of multi-bit binary numbers, corresponding input and output signal names, circuit nodes, and associated scaled capacitors described herein can each be identified with a reference label including a signal name followed by a bit number. For example, a reference label "A0" denotes a signal name of "A" and a bit number of "0".

The Specification and Figures of the present disclosure represent N-bit binary numbers through the use of a "sign plus magnitude" notation. For example, the N-bit binary number "A" includes a sign bit "SignA" in conjunction with a magnitude A(0:2). In this example, the SignA value of a logical "1" is used to indicate a positive number, while a SignA value of a logical "0" is used to indicate a negative number. The least-significant bit of a multi-bit binary number is referred to with a bit number of "0", e.g., "A0." Larger bit numbers are used to denote bits of higher significance in multi-bit binary numbers herein. Using, as an example, a three-bit binary number "A" that includes bits "0," "1" and "2," i.e., A0:A2, A0 is the least-significant, or lowest order, bit and A2 is the most-significant, or highest order, bit. For ease of discussion, in the case of a binary number having an arbitrary or unknown number of bits, the most significant bit of such a number may be referred to herein as the "$n^{th}$" bit. In the context of the present disclosure, such reference labels can begin with, for example, "A," "B," "Aup," "Bup," "Adn" or "Bdn."

For ease of discussion a single reference label, e.g., "Aup0", may be used in conjunction with multiple descriptors to identify various entities and elements depicted in the figures and discussed in the Specification. For example, terms such as "input Aup0," "bit Aup0" and "scaled capacitor Aup0" may each be understood to refer to various entities and items related to the Aup0 bit of a binary number input to a subtractor circuit. Scaled capacitors having reference labels beginning with "Aup" or "Bup" may also be referred to herein as "true capacitors," while scaled capacitors having reference labels beginning with "Adn" or "Bdn" may similarly be referred to as "complement capacitors."

Various aspects of the present disclosure may be useful for providing rapid subtraction capability and high-throughput computational capabilities to an IC and/or processor circuit for applications where limited numerical precision may be useful. Embodiments of the present disclosure can result in reductions in IC area and operating power required to implement subtractor circuits such as charge-scaling subtractors. Such embodiments may be implemented through the use of using existing and proven IC technologies, design tools, methodologies and fabrication techniques.

Embodiments can also provide flexibility in the processing of pairs of operands to be subtracted, or depending on the signs of the operands, added. As depicted and described herein, embodiments of the present disclosure can receive a pair of N-bit binary numbers, with each number of the pair having a positive, negative, or zero value. Embodiments as described herein are not constrained to receive a subtrahend on a particular input, and a minuend on another input; either input can receive either operand, whether positive, negative or zero. This flexibility can be particularly useful when designing embodiments into a digital system.

Certain classes of emerging and rapidly growing computer-based "data-centric" applications can both process, e.g., perform calculations on, and generate vast, unprecedented volumes of data in the course of pursuing a solution/answer to particular problems. Such classes of applications can, for example, start with a model and a set of initial conditions and can generate very large volumes of data on route to a solution, or can begin with vast datasets and seek succinct explanations for them.

"Data-centric" application classes can generally include, for example, machine learning (ML) and deep-learning problems/projects, artificial intelligence (AI) and logical inference applications, data mining, real-time high-throughput data analysis and neural networks. Particular application types within these classes can include genomics, nuclear physics simulations, seismology predictions, climate science and medical research. These classes and types of data-centric applications can be designed to make decisions and perform further sets of calculations based on the results of calculations performed on the vast amounts of data.

Existing hardware functions and corresponding software used to perform calculations on the vast amounts of data can include generally high-precision arithmetic operations and corresponding data formats, for example, 64-bit, double-precision or floating-point additions, subtractions and multiplications, as commonly used in scientific modeling applications. While such arithmetic operations can be used to process large amounts of data, the high degree of precision inherent in such operations is frequently not critical to subsequent tasks of making decisions based upon computational results, or performing further computations on the data. Decision-making and subsequent calculations for data-centric applications can frequently be successfully performed on data values having limited or lower precision than data produced by double-precision or floating-point operations, with no change or compromise to the end results of the computations.

Such limited-precision arithmetic operations can be performed by a variety of computing hardware systems, for example, a general-purpose computing system, a server, a supercomputer or high-performance computer (HPC) that is specially designed for a particular application. These systems can include, for example, ICs and software which can selectively employ a variety of types of binary arithmetic hardware functions and associated software integrated to access the hardware functions. Such a computing scheme can be known as a "mixed-precision" computing environment, due to the variety of numerical precisions which may be employed for particular computations. Mixed-precision computing environments can include, for example both high-precision, e.g., 64-bit, double-precision or floating-point subtraction operations alongside relatively low-precision operations such as 16-bit, or half-precision floating-point arithmetic and integer arithmetic operations. Such mixed-precision computing environments can produce higher computational efficiency and throughput when employed to host data-centric computing applications.

Certain other types of applications which process data at high throughput rates may not require high-precision calculations, and can thus benefit from the use of high-speed, limited-precision arithmetic functions. Such applications can include, for example, digital audio and video signal processing, where processing speed may be of significantly greater importance than absolute accuracy. For example, slight arithmetic inaccuracies in audio or video editing, rendering and playback functions may not be noticeable to an end-user of such applications. Other types of applications which may benefit from high-speed, limited-precision arithmetic operations can include real-time data processing applications such as inventory control or stock-trading applications, where the rate at which data can be processed takes precedence over the absolute accuracy of such data. In many such applications, access to, and processing of, real-time data may be substantially more important to subsequent decision-making than is the absolute accuracy of such data.

Embodiments of the present disclosure can be useful for providing high-speed, limited precision numerical subtraction capability to an IC and/or processor circuit. Such an IC or processor circuit can be integrated into a wide variety of mixed-precision computational systems such as general-purpose computing systems, servers, supercomputers or HPCs. The integration of embodiments within such computational systems can result in significant acceleration of certain arithmetic operations when compared to existing implementation of these arithmetic operations on hardware employing only binary signal values and corresponding devices. Additionally, embodiments can provide for significantly reduced hardware power consumption and IC layout area required for arithmetic function implementation. Computational systems implemented with embodiments can experience significant increases in computational throughput capability, which can result in accelerated completion of computational tasks, and an ability to perform vast computational tasks which may have been previously impractical to perform.

Certain embodiments relate to providing, through the use of a charge-scaling subtractor circuit, rapid subtraction of binary numbers. FIG. 1 includes a schematic depiction of a 3-bit charge-scaling subtractor circuit 100, fabricated within an IC 110, according to embodiments of the present disclosure. FIG. 1 and the associated discussion herein can be particularly useful in providing a general understanding of the operating principles, advantages and limitations of a charge-scaling subtractor circuit that is fabricated and operated within an IC 110. In embodiments, IC 110 can also include digital logic 104, analog-to-digital converter 106 and digital logic 108, which can each be used in conjunction with the charge-scaling subtractor 100. In embodiments, the charge-scaling subtractor circuit 100 can be configured to provide rapid addition or subtraction of received binary numbers for ICs such as central processing units (CPUs), graphics processing units (GPUs), application-specific integrated circuits (ASICs), and special-purpose ICs. A charge-scaling subtractor 100 as depicted in FIG. 1 can be fabricated with a wide variety of IC technologies and associated design methodologies, including, but not limited to, complementary metal-oxide semiconductor (CMOS), silicon on insulator (SOI), gallium arsenide (GaAs) and silicon-germanium (SiGe) IC technologies.

Digital logic 104 can include, for example, a processor or processor core, a first-in, first-out (FIFO) memory device, a register, state machine, or other circuit or function configured to supply binary numbers, sign bits, and a RESET signal to the corresponding inputs of 3-bit charge-scaling subtractor 100. According to embodiments, a RESET signal supplied by digital logic 104 can be interleaved with pairs of binary numbers, e.g., A(0:2) and B(0:2), and corresponding sign bits SignA and SignB to 3-bit charge-scaling subtractor 100. (See FIG. 3). Within the configuration depicted in FIG. 1, 3-bit charge-scaling subtractor 100 can receive binary numbers A(0:2), B(0:2), corresponding sign bits SignA and SignB, and RESET signals from digital logic 104.

In response to receiving input signals from digital logic 104, 3-bit charge-scaling subtractor 100 subsequently sums the binary numbers A and B, and provides an analog difference output signal representing the sum of A plus B at the difference output node DIFF. It can be understood that, according to embodiments, subtraction of binary numbers A and B can be accomplished by adding a negative copy of the subtrahend to a minuend by changing the sign of a subtrahend input. In some applications, digital logic 104 can be used to manage the manipulation of the signs of the minuend or the subtrahend, as required, to accomplish either an addition or subtraction operation. According to embodiments, either operand, e.g., binary number A or B, of 3-bit charge-scaling subtractor 100 can be positive, negative, or zero, allowing subtractor 100 to be used in wide variety of arithmetic operations.

The analog difference output signal can be received by analog-to-digital converter (ADC) 106, which is electrically connected to the subtractor 100's difference output node DIFF. Once ADC 106 has converted the value of the received difference analog output signal to a binary number, the binary number can be received by digital logic 108. Digital logic 108 can include, for example, a processor or processor core, a FIFO memory device, register or other circuit or function configured to receive binary numbers from analog-to-digital converter 106.

In embodiments, ADC 106 can include converter types such as a flash ADC, a resistor ladder ADC, a parallel comparator ADC, a successive-approximation ADC and a counter-type ADC. An IC designer may select a particular type of ADC in order to meet particular design criteria such as conversion speed, power usage, IC area consumption or an analog voltage input range. For example, according to embodiments, the analog output signal at the difference output node DIFF of 3-bit charge-scaling subtractor 100 can be in a range between a ground (GND) and an IC supply voltage $V_{DD}$. Accordingly, an ADC 106 can be chosen by an IC or circuit designer that can receive analog signals in such an input voltage range.

Charge-scaling subtractor 100 is configured to receive two 3-bit binary numbers A and B and output a voltage that is an analog of the sum of these binary numbers, which when re-converted to binary by ADC 106, includes 4 bits. This, however is not to be construed as limiting. It can be understood that, according to embodiments, the binary numbers input to such a subtractor can include a different number of bits, e.g., 2, 4, 5, etc., and that the corresponding output can include a number of bits sufficient to represent the sum of the two binary input numbers.

According to embodiments, a subtractor such as 3-bit charge-scaling subtractor 100 can have significant performance, power consumption and IC area advantages over other types of subtractor circuits that employ only binary, i.e., logical "0" and "1," signal states to represent numbers. It is contemplated that, in comparison to traditional binary subtractor circuits, a charge-scaling subtractor can be used to subtract binary numbers approximately 5× faster, consume approximately 1% of the power, and require approximately 10% of the area of traditional binary subtractor circuits.

According to embodiments, charge-scaling subtractor 100 includes two sets 120 and 122 of scaled capacitors $C_{Scaled}$, each set having binary-weighted capacitance value ratios. Scaled capacitors $C_{Scaled}$ are interconnected to form a capacitive voltage-divider circuit to generate an analog voltage representing the sum of the two 3-bit binary numbers A and B at difference output node DIFF.

According to embodiments, reset circuit 130, in conjunction with control circuit 112 is used to draw the difference output node DIFF to a voltage equal to one half of an IC supply voltage ($V_{DD}$). This $V_{DD}/2$ "reset voltage" level is used to represent a numerical "0" value of a sum of binary numbers A and B. In accordance with the use of 3-bit charge-scaling subtractor 100 as described above, a numerical value can represent a difference of binary numbers A and B, e.g., A−B, when subtractor 100 is used to add a negative copy of B to A, e.g., A+(−B).

In embodiments, the difference output node DIFF is reset to $V_{DD}/2$ prior to each addition operation performed on a pair of two 3-bit binary numbers A and B. Following each reset operation, in response to receiving a pair of two 3-bit binary numbers A and B, control circuit 112 generates a sets of outputs, e.g., Aup(0:2), Adn(0:2) and Bup(0:2), Bdn(0:2), that correspond to the values of the binary numbers A and B, respectively. These values are driven onto input terminals of the scaled capacitors $C_{Scaled}$, which results in the difference output node DIFF being driven to an analog voltage representing the sum of the two 3-bit binary numbers A and B.

The two sets of "N" inputs, i.e., A(0:2) and B(0:2), where N=3, are configured to receive the 3-bit binary numbers A and B, respectively. The SignA and SignB inputs, corresponding to the A(0:2) and B(0:2) inputs, respectively, are similarly configured to receive the corresponding sign bits of A and B. In embodiments, a sign bit at a logical "0" value indicates that the corresponding 3-bit binary number is negative, and a sign bit at a logical "1" value indicates that the corresponding 3-bit binary number is positive. Each input or bit belonging to both A and B inputs is indexed by an integer bit number "n" corresponding to the bit's respective significance, where n is in a range between and including 0 and N-1, e.g., n=0, 1, 2. According to embodiments, and the discussed example, A0 is the least significant bit, while A2 is the most significant bit.

According to embodiments, charge-scaling subtractor 100 includes two sets 120 and 122 of scaled capacitors $C_{Scaled}$, each set having binary-weighted capacitance value ratios. Set 120 is associated with the inputs representing binary number A, i.e., A(0:2) and SignA, while Set 122 is associated with the inputs representing binary number B, i.e., B(0:2) and SignB.

In embodiments, set 120 includes a "true" capacitor and a "complement" capacitor corresponding to each respective bit number "n" of binary number A. For example, "true" capacitors can be understood to be those having reference labels beginning with "Aup," and "complement" capacitors are those having reference labels beginning with "Adn." Similarly, set 122 includes a "true" capacitor and a "complement" capacitor corresponding to each respective bit number "n" of the binary number B. Following the example, "true" capacitors are those having reference labels beginning with "Bup," and "complement" capacitors are those having reference labels beginning with "Bdn." Each capacitor of the sets 120 and 122 of scaled capacitors corresponding to nodes Aup(0:2), Adn(0:2), Bup(0:2) and Bdn(0:2) has an input terminal electrically connected to a corresponding respective $n^{th}$ output of control circuit 112, e.g., Aup0, Aup1 and Aup2.

Each scaled capacitor of the sets 120 and 122 has an assigned scaled capacitance value proportional to the significance or bit number "n" of each corresponding bit of binary number inputs A and B. Accordingly, an assigned scaled capacitance value is equal to $2^{(n)}$*a unit capacitance value ($C_{UNIT}$) or "C." For example, the set of nodes Aup(0:2) includes nodes and associated scaled capacitors Aup0, Aup1 and Aup2. Scaled capacitor Aup0, associated with the least significant bit A0 of the binary number A(0:2), is assigned a value of $C_{UNIT}$. Scaled capacitor Aup1 is connected to the A1 input, which receives the next most significant bit A1 of A(0:2), and is assigned a value of 2*$C_{UNIT}$. Scaled capacitor Aup2, connected to the A2 input which receives the most significant bit of the A2 and is assigned a value of 4*$C_{UNIT}$. The capacitance values of scaled capacitors associated with nodes Adn(0:2), Bup(0:2), and Bdn(0:2) are similarly proportioned. In embodiments, the scaled capacitors e.g., Aup0 . . . Aup2 can include capacitor types such as metal-insulator-metal (MIM) capacitors, metal-oxide semiconductor (MOS) capacitors, and deep trench (DT) capacitors.

Reset circuit 130 can be used, in conjunction with control circuit 112 to draw difference output node DIFF to a reset voltage of $V_{DD}/2$, prior to the application of each set of binary inputs A and B to subtractor 100. Reset circuit 130 includes inverters I1, I2, I3, N-channel field-effect transistor (NFET) N1 and P-channel field-effect transistor (PFET) P1. Inverters I1, I2 are configured to activate NFET N1 in response to a signal received on reset input 102. Similarly, inverter I3 configured to activate PFET P1 in response to a signal received on reset input 102. In embodiments, the activation of NFET N1 and PFET P1 in response to the assertion of reset input 102 to a logical "1" state results in difference output node DIFF being drawn to ground.

According to embodiments, the RESET signal 102 is generated by digital logic 104 and can be used to control reset circuit 130. The inverters I1, I2, I3, NFET N1 and PFET P1 are depicted and described herein as example devices; according to embodiments, other types of devices, e.g., logic gates and transistors, can be used within reset circuit 130.

When reset circuit 130 is not active, i.e., not drawing difference output node DIFF to ground, the reset input 102 remains at a logical "0" level, thus causing NFET N1 and PFET P1 to both be turned off. NFET N1 and PFET P1 each being in an "off" state allows difference output node DIFF to be drawn to a voltage by the scaling capacitors $C_{Scaled}$ without interference from NFET N1 and PFET P1.

During operation of the subtractor 100, a voltage level, e.g., an IC supply voltage $V_{DD}$ or GND, representing a logical "1" or logical "0," respectively, is driven by digital logic 104 to each bit of the two sets of inputs A(0:2) and B(0:2) and to the two corresponding sign bits, SignA and SignB, in order to represent the two signed binary numbers A and B. In some embodiments, an IC supply voltage $V_{DD}$ can be within a specified range, for example, between 0.9 V and 1.1 V. Control circuit 112 includes buffers that are used to drive the Aup(0:2), Bup(0:2), Adn(0:2) and Bdn(0:2) outputs in response to the received A(0:2), SignA, B(0:2) and SignB inputs.

In embodiments, values of these outputs can be applied to the scaled capacitors $C_{Scaled}$, in order to charge them to known values that represent a numerical "0" on difference output node DIFF. Control circuit 112 can be used, in conjunction with reset circuit 130 to initialize scaled capacitors $C_{Scaled}$ to voltages corresponding to particular logical states, prior to receiving binary numbers at the A and B inputs of 3-bit charge-scaling subtractor 100.

The Aup(0:2), Bup(0:2), Adn(0:2) and Bdn(0:2) outputs can also be driven to the scaled capacitors 120 and 122 in order to draw the difference output node DIFF to a value representing a sum of the numbers received at the A(0:2) and B(0:2) inputs. According to embodiments, the Aup(0:2), and Adn(0:2) outputs are used to drive input terminals of true capacitors Aup(0:2) and of complement capacitors Adn(0:2), respectively. Similarly, the Bup(0:2), and Bdn(0:2) outputs are used to drive input terminals of true capacitors Bup(0:2) and of complement capacitors Bdn(0:2), respectively.

According to embodiments, Table 1 below represents the relationships between the SignA and A(X) inputs to control circuit 112 of subtractor 100 and the internal nodes Aup(0:2) and Adn(0:2), and difference output node DIFF. The column labeled "SignA" includes logical values representing the sign of a binary number A received by the 3-bit charge-scaling subtractor 100. According to embodiments, a logical "0" represents a negative number and a logical "1" represents a positive number. The column labeled "A(X)" includes logical values representing an individual or representative bit "X" of the binary number A. The column labeled "A(X) (Numerical Value)" includes numerical values representing the signed value of the particular representative bit of the binary number A. The columns labeled "AupX" and "AdnX" includes logical values driven by control circuit 112 onto the Aup(0:2) and Adn(0:2) outputs, respectively, in response to the particular corresponding A(X) and SignA inputs. According to embodiments, Aup(0:2) outputs of control circuit 112 are buffered copies of the SignA inputs, in accordance with entries of Table 1. Similarly, Adn(0:2) outputs of control circuit 112 are buffered copies of the A(X) inputs. The column labeled "DIFF (Analog Voltage)" indicates an analog voltage on the difference output node DIFF resulting from the application of the Aup(0:2) and Adn(0:2) outputs to the scaled capacitors 120 and 122.

The rows of Table 1 include the logic states/voltages of internal nodes AupX and AdnX and the difference output node DIFF voltages that result from the application of unique combinations of the inputs SignA and A(X). It can be understood that Table 1 represents nodes and signals associated with the binary input A, and that the nodes and signals associated with binary input B are generally consistent.

TABLE 1

| SignA | A(X) | A(X) (Numerical Value) | AupX | AdnX | DIFF (Analog Voltage) |
|---|---|---|---|---|---|
| 0 | 1 | −1 | 0 | 1 | GND |
| 0 | 0 | 0 | 0 | 0 | $V_{DD}/2$ |
| 1 | 0 | 0 | 1 | 0 | $V_{DD}/2$ |
| 1 | 1 | +1 | 1 | 1 | $V_{DD}$ |

According to embodiments, it can be appreciated that an internal state of control circuit 112 corresponding to line 3 of Table 1, where DIFF equals $V_{DD}/2$ in response to SignA being at a logical "1," and A(X), for all bits "X," being at a logical "0" can represent a numerical value of A(X)=0, for all bits "X." In embodiments, control circuit 112 can be reset to this state by assertion of the A(X) and SignA inputs, in conjunction with the use of reset circuit 130, as described above.

Following this reset operation, receiving of binary inputs A and B can cause the outputs Aup (0:2), Bup (0:2), Adn (0:2) and Bdn (0:2) to draw the scaled capacitors $C_{Scaled}$ to voltages that represent the binary numbers A and B. As a result, the difference output DIFF is thus drawn to an analog difference voltage that is proportional to the binary-weighted sum of the two input values A(0:2) and B(0:2). In embodiments, the difference voltage can be in a range between GND and an IC supply voltage $V_{DD}$.

According to embodiments, a DIFF voltage that is less than $V_{DD}/2$ indicates a negative binary-weighted sum, and a DIFF voltage greater than $V_{DD}/2$ indicates a positive binary-weighted sum. The operations and sequencing involved in resetting 3-bit charge-scaling subtractor 100 are further depicted in and described in reference to FIG. 2. A more detailed sequence of resetting subtractor 100 calculating sums of binary numbers A and B is further depicted in and described in reference to FIG. 3.

The embodiment of the present disclosure depicted in FIG. 1 includes capacitors having reference labels indicating capacitance values such as "C," and multiples of C, e.g., "2C" and "4C." "It can be understood that the capacitance value "C" denotes a "unit capacitance" or "$C_{UNIT}$" value. In the context of the present discussion, the terms "C" and "$C_{UNIT}$" may be used interchangeably.

In embodiments, the value of unit capacitance $C_{UNIT}$ can be chosen by an IC designer, in accordance with various design criteria and tradeoffs. For example, a $C_{UNIT}$ value can be chosen to be appreciably larger than individual or collective values of parasitic capacitors in a particular charge-scaling subtractor circuit or circuit technology. Choosing a $C_{UNIT}$ value that is appreciably larger than parasitic capacitors can be useful in enhancing the accuracy of an analog voltage produced by a capacitive voltage-divider circuit including a reference capacitor. By way of example, the unit capacitance $C_{UNIT}$ can be approximately 1 fF, for a 14 nm CMOS or SOI technology. Other $C_{UNIT}$ values may be chosen and used for charge-scaling subtractors fabricated in other IC technologies. In some embodiments, the $C_{UNIT}$ value can be specified to be in a range between 2× and 10× that of an input capacitance value of an ADC, e.g., ADC 106, FIG. 1, that is connected to the difference output node DIFF of the charge-scaling subtractor, e.g., 100.

A $C_{UNIT}$ value can also be chosen in order to minimize, manage, or optimize the total IC circuit area used for a charge-scaling subtractor circuit design. If the $C_{UNIT}$ value, and thus, the total IC circuit area allocated to capacitors becomes excessive, the total IC circuit area required to implement certain embodiments of the present disclosure may exceed a specified maximum circuit area.

FIG. 1 depicts an example of a charge-scaling subtractor circuit, according to embodiments of the present disclosure. However charge-scaling subtractor circuits employing other circuit topologies not described herein and/or employing combinations of elements described herein may be contemplated, within the spirit and scope of the present disclosure.

In some embodiments, the precision of subtraction operations performed with a charge-scaling subtractor such as subtractor 100 may be limited. For example, a 3-bit charge-scaling subtractor may have a reduced or limited precision such that the voltage proportional to a sum of the two received 3-bit binary numbers is within a range corresponding to +/−1 least significant bit (LSB) of the received 3-bit binary numbers. Such an accuracy limit can result, for example, from factors such as dimensional and repeatability limitations of a particular semiconductor process. Dimensions of semiconductor structures, e.g., scaled capacitors, may vary due to such semiconductor process limitations, which can result in the capacitance value of scaled capacitors deviating from a specified value. Such deviations can cause deviations in difference output voltages from a specified value, which may result in incorrect translation of this voltage level by analog-to-digital converter 106 into a binary number representing the difference.

In certain applications, the functional accuracy of a charge-scaling subtractor may be limited by the resolution of an ADC such as 106. By way of example, for a supply voltage $V_{DD}$ of 1.0 V, a particular ADC may only be able to accurately translate DIFF output voltage steps of 4 mV or greater into binary numbers. In some cases, the accuracy of such an ADC may alternately be limited by a number of steps or divisions of the example supply voltage $V_{DD}$ of 1.0 V. For example, such an ADC may only be able to resolve 250 or fewer divisions of the example $V_{DD}$ of 1.0 V. In some embodiments, a smallest voltage increment of the voltage proportional to a sum of the two received N-bit binary numbers can be greater than an operating voltage of an ADC divided by 250.

Embodiments of the present disclosure can also be integrated effectively into computing hardware and systems designed to perform mixed-precision mathematical operations, in which trade-offs are dynamically made by the system between computational speed and computational accuracy. Embodiments can provide such a system with a particularly rapid and energy-efficient alternative to traditional binary computational hardware.

Certain computing systems and associated software applications may not require highly accurate mathematical operations and may be able to function successfully while using limited or reduced-precision operations such as subtraction, as can be provided by embodiments. Aspects of the present disclosure can be useful in performing subtraction of binary numbers at a significantly increased speed relative to traditional subtractor circuits and devices. Such increased computational speed can be particularly useful within computing systems and associated software applications requiring a great number of operations to be performed but where high-precision is not required. Such applications can include data-centric tasks such as AI, data mining, cognitive computing solutions and the like, and may be hosted on computing hardware platforms such as HPCs or supercomputers. Embodiments of the present disclosure can be easily integrated into ICs and other data-processing hardware used within such hardware platforms as HPCs or supercomputers.

Figure 2:
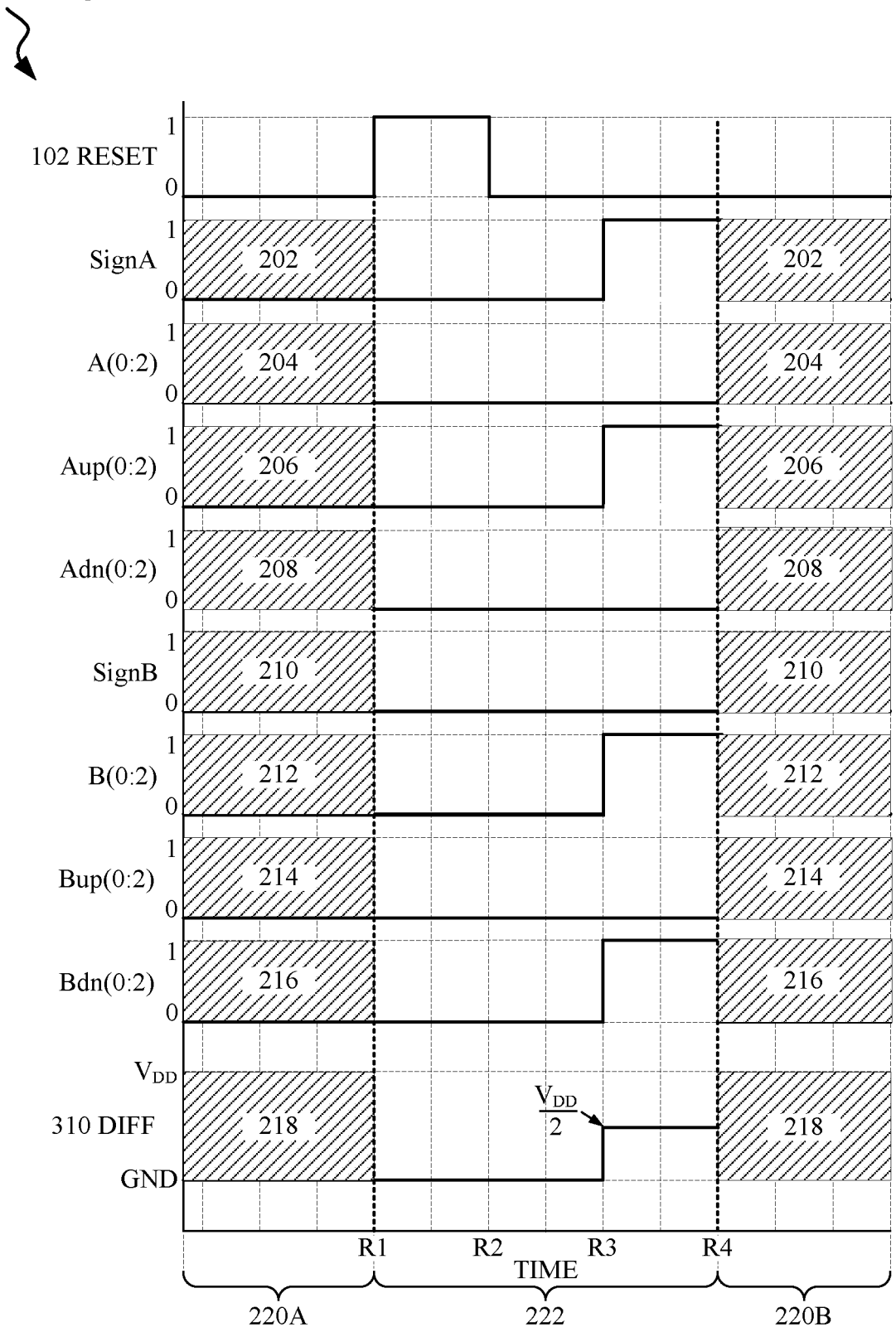
FIG. 2 is a waveform diagram depicting a reset timing sequence of a 3-bit charge-scaling subtractor circuit, according to embodiments consistent with the figures.
Figure 3:
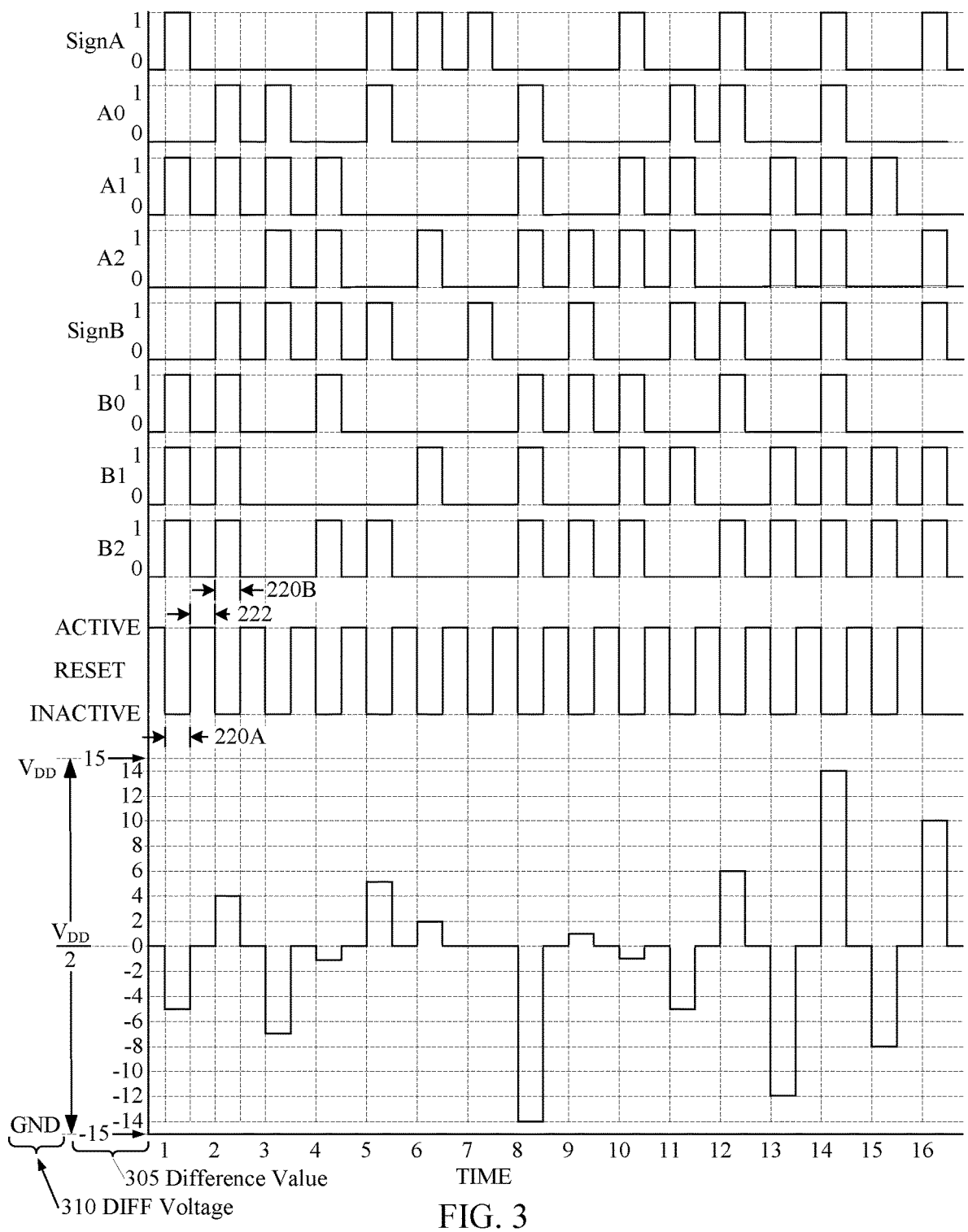
FIG. 3 is a waveform diagram depicting the results of arithmetic operations generated by a 3-bit charge-scaling subtractor circuit, according to embodiments consistent with the figures.

FIG. 2 is a waveform diagram depicting a reset sequence 200 of a 3-bit charge-scaling subtractor circuit 100, FIG. 1, according to embodiments consistent with the figures. FIG. 2 includes signal waveforms for inputs, outputs, and internal nodes of the 3-bit charge-scaling subtractor circuit 100 of FIG. 1, according to embodiments consistent with the figures, particularly FIG. 1. The input, output, and internal node signal waveforms provided in FIG. 3 can provide a visual understanding of causal relationships between logical values of the input signals, i.e., SignA, A0 . . . A2, SignB, B0 . . . B2 and RESET 102, and resulting values of the internal nodes, e.g., Aup(0:2), Bup(0:2), Adn(0:2), Bdn(0:2) and the difference output node DIFF. FIG. 3 is used to depict a sequence of asserted signals that is particularly useful in drawing the difference output node DIFF to a voltage level of $V_{DD}/2$, corresponding to an analog voltage that represents a numerical "0" output value of 3-bit charge-scaling subtractor 100. Subsequently applied signed number inputs A and B can, in embodiments, draw the difference output node DIFF from the $V_{DD}/2$ (numerical "0") value to an analog voltage that represents a numerical value of an arithmetic sum of A and B.

The vertical axis of FIG. 2 includes labels corresponding to charge-scaling subtractor input, output and internal node signals. Progressing from the top of the vertical axis downwards, labels appear for each of the input signals RESET 102, SignA, A(0:2), Aup(0:2), Adn(0:2), SignB, B(0:2), Bup(0:2), Bdn(0:2), along with corresponding labels for logical "0" and logical "1" states for each input signal. In accordance with voltages used to represent logic states within an integrated circuit, it can be understood that an input signal logical "1" state corresponds to an input voltage equivalent to an IC supply voltage, e.g., $V_{DD}$. Similarly, it can be understood that an input signal logical "0" state corresponds to an input voltage equal to 0.0 V or GND. Below the input signal labels are labels for the DIFF node voltage 310, ranging from GND to $V_{DD}$. The value of DIFF node voltage 310 of $V_{DD}/2$ represents a numerical sum value of "0." A DIFF node voltage 310 greater than $V_{DD}/2$ represents a positive numerical sum value, while A DIFF node voltage 310 less than $V_{DD}/2$ represents a negative numerical sum value.

Reset sequence 200 can be initiated and driven by digital logic 104, as depicted in and described in reference to FIG. 1. The horizontal axis at the bottom of FIG. 2 corresponds to a unitless sequence of times at which input signals are applied to inputs of the charge-scaling subtractor 100, FIG. 1. Time intervals between times R1 . . . R4 can be determined by the speed of logic/circuit operations in digital logic 104. In some embodiments, for example, the time interval between each labeled unitless time can be, for example, approximately 10 ps, in accordance with circuitry delays and performance characteristics of a particular IC technology.

According to embodiments, during operating interval 220A, prior to time R1, 3-bit charge-scaling subtractor 100 is generating and driving a voltage representing the sum of binary numbers A and B. The timing regions 202, 204, 206, 208, 210, 212, 214, 216 and 218 each represent intervals of time associated with various signals during which the signal values correspond to those involved in generating a sum of binary numbers. Operating intervals 220A and 220B correspond directly to consistent operating intervals 220A and 220B, FIG. 3. Operating intervals 220A and 220B and reset interval 222 can be useful in providing a visual understanding of the interleaving of reset sequence 200, during reset interval 222, between successive summing operations during operating intervals 220A and 220B, respectively.

At time R1, RESET 102 is asserted to a logical "1" state. Consistent with FIG. 1 and associated text, this signal assertion simultaneously activates NFET N1 and PFET P1, causing them to draw the difference output node DIFF to GND. Drawing the difference output node DIFF to GND is useful in drawing one terminal of each of the scaled capacitors $C_{Scaled}$ to ground. At time R1 each of the sign bits SignA and SignB and each of the bits of the binary numbers A(0:2) and B(0:2) are asserted to a logical "0." The nodes Aup(0:2), Adn(0:2), Bup(0:2) and Bdn(0:2) assume logical states consistent with Table 1, above.

At time R2 RESET 102 returns to a logical "0" state. Following this transition, the difference output node DIFF remains at GND, and the NFET N1 and PFET P1 are turned off or deactivated, thus allowing the difference output node DIFF to be drawn to a voltage other than GND without interference from NFET N1 or PFET P1.

At time R3 the sign bit SignA and B(0:2) are asserted to logical "1" states, while RESET 102 remains at a logical "0" state. These assertions cause Aup(0:2) and Bdn(0:2) to transition to logical "1" states, causing the voltage of the difference output node DIFF to be drawn to $V_{DD}/2$, representing a numerical sum value of "0" on the difference output node DIFF.

At time R4 the reset sequence 200 ends with the 3-bit charge-scaling subtractor 100 receiving a subsequent pair of binary numbers A and B and associated sign bits SignA and SignB.

FIG. 3 is a waveform diagram depicting the results of arithmetic operations generated by a 3-bit charge-scaling subtractor circuit, according to embodiments consistent with the figures. FIG. 3 includes input and output signal waveforms of the 3-bit charge-scaling subtractor circuit 100 of FIG. 1, according to embodiments consistent with the figures, particularly FIG. 1. The input and output signal waveforms provided in FIG. 3 can provide a visual understanding of causal relationships between logical values of the input signals, i.e., SignA, A0 . . . A2, SignB, B0 . . . B2 and Reset 102, FIG. 2, the DIFF node output voltage 310 and the difference values 305 of the DIFF output signal. For example, FIG. 3 depicts a series of several sets of binary number inputs, i.e., the values corresponding to the A0 . . . A2 and B0 . . . B2 inputs, and the resulting difference values 305 and DIFF node voltage 310.

FIG. 3 can be useful in depicting the speed and efficiency of a charge-scaling subtractor circuit, e.g., 100, FIG. 1, relative to various types of binary subtractor circuits. Binary subtractor circuits such as half subtractors, full subtractors, ripple-borrow subtractors and borrow-lookahead subtractors can, depending on architecture, complexity, and the number of bits in the minuend and subtrahend, require several logic clock cycles to complete a subtraction operation. Propagation of signals representing carry bits can contribute significantly to the delay of such subtractors. As depicted in FIG. 3, the subtraction of two binary numbers using the charge-scaling subtractor circuit 100 of FIG. 1 is completed directly following the application of the two binary numbers, which can amount to a significant time savings with respect to other types of binary subtractor circuits. It is contemplated that particular embodiments of the present disclosure may complete binary number subtractions approximately 5× faster than comparable binary subtractor circuits.

The vertical axis of FIG. 3 includes labels corresponding to charge-scaling subtractor input and output signals. Progressing from the top of the vertical axis downwards, labels appear for each of the input signals SignA, A0, A1, A2, SignB, B0, B1, B2 and RESET, along with corresponding labels for logical "0" and logical "1" states for each input signal. In accordance with voltages used to represent logic states within an integrated circuit, it can be understood that an input signal logical "1" state corresponds to an input voltage equivalent to an IC supply voltage, e.g., $V_{DD}$. Similarly, it can be understood that an input signal logical "0" state corresponds to an input voltage equal to 0.0 V or GND.

Below the input signal labels are labels for the DIFF node voltage 310, ranging from GND to $V_{DD}$, and for corresponding difference values 305 ranging from −15 to +15. Difference values 305 correspond to the sum of the values of the two binary number inputs at particular points in time. According to embodiments, a DIFF voltage 310 of $V_{DD}/2$ represents a difference value 305 of "0." The scaling and correspondence of DIFF voltage 310 to difference values 305 can be useful in representing positive, negative and zero number values with an analog voltage that is in a range between GND and a supply voltage $V_{DD}$. This representation can be particularly useful in preventing the use of or need for negative supply voltages, which can increase cost and design complexity of electronic systems including embodiments of the present disclosure.

Difference values 305 each proportionally correspond to a DIFF voltage 310 that ranges between GND and $V_{DD}$. For example, the DIFF node output value of +14 corresponds to a DIFF voltage 310 approaching or adjacent to $V_{DD}$, while the DIFF node output value of −14 corresponds to a DIFF voltage 310 approaching or adjacent to GND. According to embodiments, offsets in the DIFF voltage 310 between each two adjacent difference values 305 are uniform. For example, if the DIFF voltage 310 offset between difference values 305 of 0 and 1 is 32 mV, then the DIFF voltage 310 offset between difference values 305 of 1 and 2 is also 32 mV. The voltage offsets between adjacent difference values 305 may vary slightly due to effects of various IC process parameters variations such as scaling capacitor size differences and dimensional tolerances.

The horizontal axis at the bottom of FIG. 3 corresponds to a unitless sequence of times at which sets of input signals representing signed binary numbers are applied to the A0 . . . A2, SignA and B0 . . . B2, SignB inputs of the charge-scaling subtractor. In some embodiments the time interval between each labeled unitless time can be, for example, approximately 10 ps, in accordance with circuitry delays and performance characteristics of a particular IC technology.

Following the application of each of these sequential sets of N-bit binary number input signals, a reset sequence 200, as depicted and described in reference to FIG. 2, is performed during reset interval 222 to prepare the charge-scaling subtractor 100 for receiving a subsequent set of binary numbers. Reset sequence 200 can be initiated and driven by digital logic 104, as depicted in and described in reference to FIGS. 1 and 2.

At time 1, for example, signed binary number values of +2 and −7 are applied to the SignA, A0 . . . A2 and SignB, B0 . . . B2 inputs, respectively. In response, the difference value 305 transitions to the value of −5, representing the sum of the binary numbers, i.e., the value of A plus the value of B. The SignA, A, SignB and B inputs then return to a logic "0" state, and the reset sequence 200 is subsequently asserted, resulting in the subtractor being reset and the difference value 305 transitioning to a value of 0. At time 2, binary number values of −3 and +7 are applied to the SignA, A0 . . . A2 and SignB, B0 . . . B2 inputs, respectively, and in response, the difference value 305 transitions to a value of 4. The reset sequence 200, FIG. 2 is again performed, resulting in the subtractor being reset and the difference value 305 transitioning to the value of 0. This alternating sequence of summing two binary numbers and subsequently resetting the subtractor circuit continues through time 16. As depicted, the difference value 305 can, depending on the signs and values of A and B at particular points in time, have a positive value, a negative value or can be 0.

Figure 4:
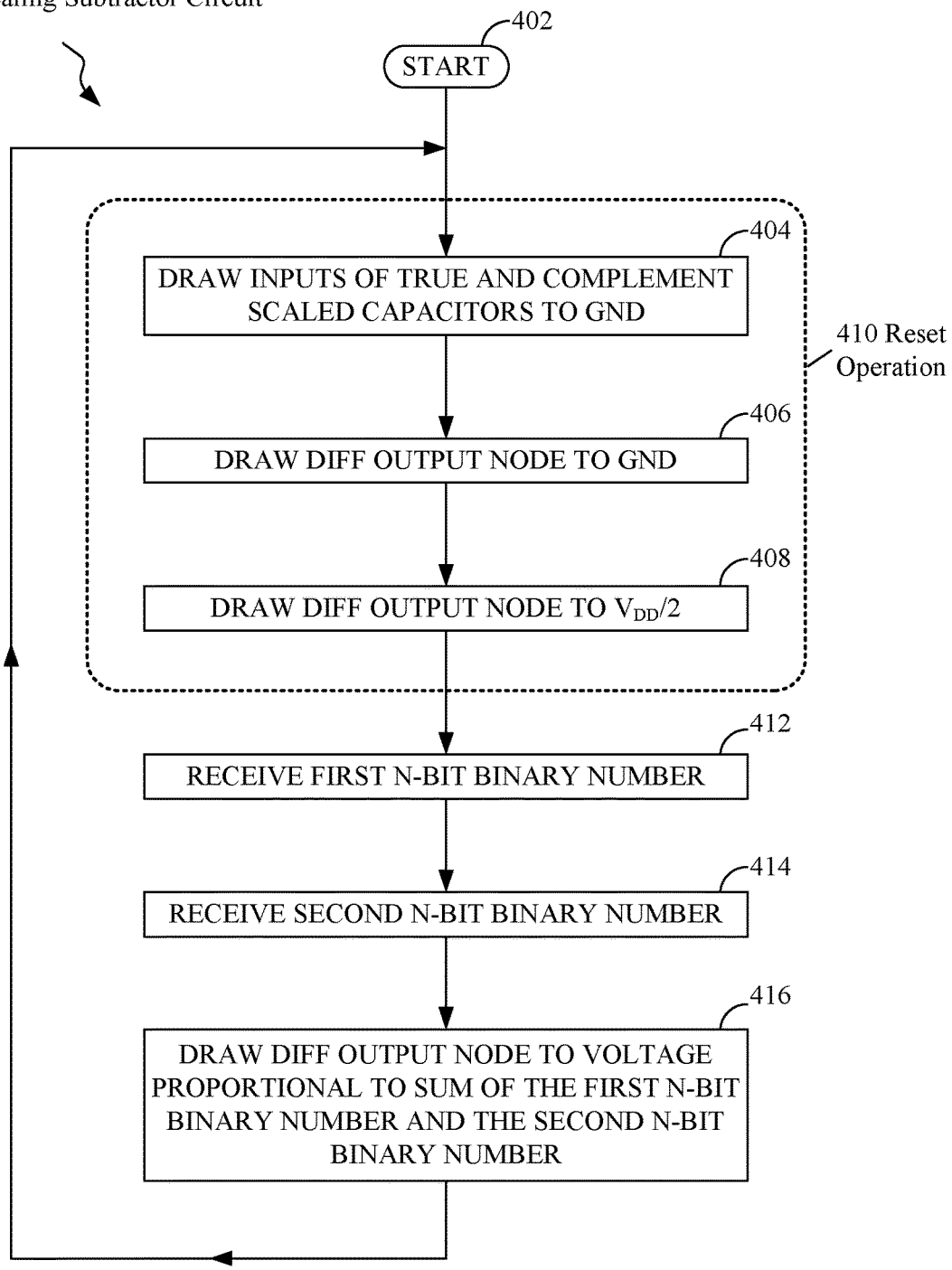
FIG. 4 is a flow diagram depicting a method for operating a charge-scaling subtractor circuit to subtract one N-bit binary number from another N-bit binary number, according to embodiments consistent with the figures.

FIG. 4 is a flow diagram depicting a method 400 for operating a charge-scaling subtractor circuit, fabricated within IC, to subtract one N-bit binary number from another N-bit binary number, according to embodiments consistent with the figures. The use of method 400 can provide, through the use of a charge-scaling subtractor circuit, rapid subtraction or addition of binary numbers. When used with embodiments such as 3-bit charge-scaling subtractor 100, FIG. 1, method 400 can also provide for substantial increases in computing system throughput through the use of limited-precision or mixed-precision subtraction operations. Such increases in computing system throughput can result in overall increases in computing system performance and benefit to computing system end-users.

It can be understood that in accordance with 3-bit charge-scaling subtractor 100, FIG. 1, the various operations described herein in reference to method 400 are generally initiated by and controlled by digital logic 104, according to embodiments. The method 400, as depicted in FIG. 4 and described below is understood to be executed in conjunction with a subtractor circuit having a first set and a second set of N binary number inputs and corresponding sign inputs, as well as sets of true and complement scaled capacitors, a difference output node DIFF and a reset circuit consistent with subtractor 100, FIG. 1.

The method 400 moves from start 402 to operation 404. The reset operation 410, includes operations 404, 406 and 408, which are performed in order to reset the 3-bit charge-scaling subtractor 100, FIG. 1, to a known state, in preparation for receiving a subsequent pair of signed operands at the A, SignA, B and SignB inputs. As described, in reference to Table 1 above, the known state is a numerical "0" value that is represented by a DIFF output voltage of $V_{DD}/2$.

Operation 404 generally refers to drawing inputs of "true" scaled capacitors, e.g., Aup(0:2) and Bup(0:2) and of "complement" scaled capacitors, e.g., Adn(0:2) and Bdn(0:2), FIG. 1, to GND. According to embodiments, this can be accomplished by asserting sign inputs SignA and SignB and binary number inputs A(0:2) and B(0:2) to logical "0" values. This operation is generally consistent with the signal waveforms depicted at time R1, FIG. 2, and can be useful in setting the Aup(0:2), Bup(0:2), Adn(0:2) and Bdn(0:2) nodes to values that correspond to a reset state representing a numerical 0 value on the difference output node DIFF. Once the true and complement scaled capacitor inputs are drawn to GND, the method 400 moves to operation 406.

Operation 406 generally refers to drawing the difference output node DIFF to GND. At time R1, FIG. 2, RESET 102, FIG. 1 is asserted to a logical "1" state. Consistent with FIG. 1 and the associated text, this signal assertion simultaneously activates NFET N1 and PFET P1, FIG. 1, causing them to draw the difference output node DIFF, FIG. 1 to GND. Drawing the difference output node DIFF to GND can be useful in removing any remaining charge on scaled capacitors 120 and 122 and in establishing a known reset voltage, e.g., $V_{DD}/2$ on the DIFF node. Once the difference output node DIFF has been drawn to GND, at time R2, FIG. 2, RESET 102, FIG. 1 returns to a logical "0" state, and the method 400 moves to operation 408.

Operation 408 generally refers to drawing the difference output node DIFF to $V_{DD}/2$. At time R3, FIG. 2, the sign input SignA and binary number inputs B(0:2), FIG. 1 are asserted to logical "1" states, while RESET 102, FIG. 1 remains at a logical "0" state. These assertions drive the Aup(0:2) and Bdn(0:2) nodes, FIG. 1, to logical "1" states, causing the capacitive voltage divider circuit formed by scaled capacitors 120 and 122 to draw the voltage of the difference output node DIFF to $V_{DD}/2$ on the difference output node DIFF. Setting the difference output node DIFF to $V_{DD}/2$ is useful in providing a reset voltage representing a numerical "0" value, from which voltage excursions, initiated by operations 412 and 414 below, can be used to represent the sum of binary numbers A and B. Once the difference output node DIFF has been drawn to $V_{DD}/2$, the method 400 moves to operation 412.

Operation 412 generally refers to the subtractor circuit receiving a first N-bit binary number. According to embodiments, the first N-bit binary number, e.g., A, is received at a first set of N inputs, e.g., A(0:2), FIG. 1, of the subtractor circuit 100, FIG. 1. In embodiments, a section of digital logic, e.g., 104, FIG. 1, within the IC 110, can be electrically connected to the subtractor circuit 100 and configured to provide the first N-bit binary number to the subtractor circuit 100. Once the first N-bit binary number has been received, the method 400 moves to operation 414.

Operation 414 generally refers to the subtractor circuit receiving a second N-bit binary number. According to embodiments, the second N-bit binary number, e.g., B, can be received at the same time as the first N-bit binary number or at a time different from when the first N-bit binary number is received. According to embodiments, the second N-bit binary number is received at a second set of N inputs, e.g., A(0:2), FIG. 1, of the subtractor circuit 100, FIG. 1. In embodiments, a section of digital logic, e.g., 104, FIG. 1, within the IC 110, can be electrically connected to the subtractor circuit and configured to provide the second N-bit binary number to the subtractor circuit 100. Once the second N-bit binary number has been received, the method 400 moves to operation 416.

Operation 416 generally refers to drawing the difference output node DIFF of the subtractor circuit 100, FIG. 1 to a voltage proportional to a sum of the first and the second N-bit binary numbers. According to embodiments, the scaled capacitors 120 and 122, FIG. 1 of the subtractor circuit 100, FIG. 1, are each drawn to voltages that represent the binary numbers A, and B, respectively, by respective outputs of control circuit 112, FIG. 1. (See FIG. 1 and the associated text for details.) The capacitive voltage divider circuit formed by the interconnection of scaled capacitors 120 and 122 can provide, in response to the outputs of control circuit 112, FIG. 1, a voltage that represents a sum value that is positive, negative, or zero. In some embodiments, drawing the difference output node DIFF of the subtractor circuit 100, FIG. 1, to the voltage proportional to the sum of the first and second N-bit binary numbers can be followed by converting, with an ADC 106, FIG. 1, within the IC 110, FIG. 1, the voltage to a binary number representing the sum of the first and second N-bit binary numbers. Once the difference output node DIFF is drawn to a voltage proportional to a sum of the N-bit binary numbers, the method 400 returns to operation 404.

Figure 5:
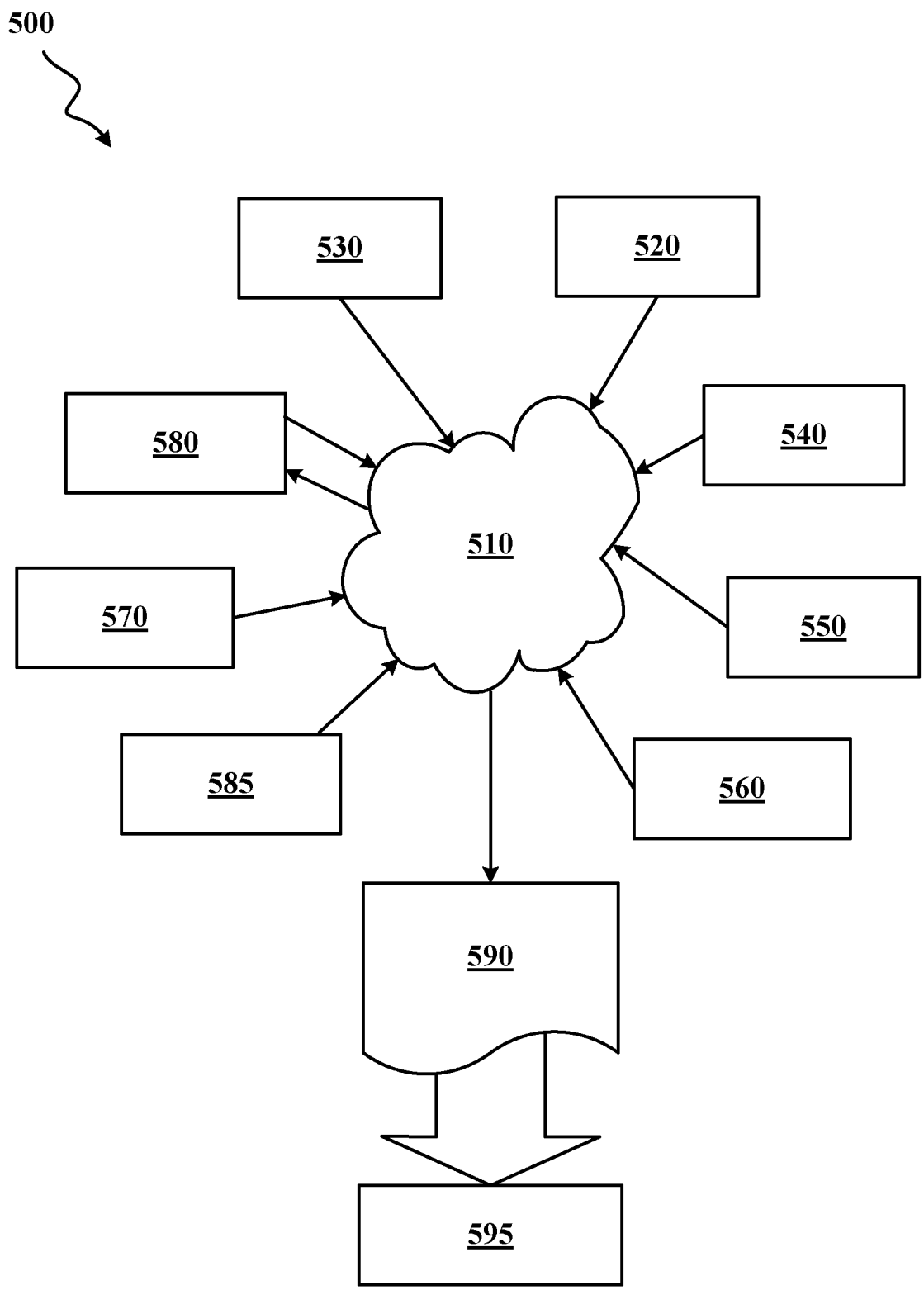
FIG. 5 illustrates multiple design structures including an input design structure that is preferably processed by a design process, according to embodiments consistent with the figures.

FIG. 5 depicts multiple design structures 500 including an input design structure 520 that is preferably processed by a design process, according to embodiments consistent with the figures. Input design structure 520 may be a logical simulation design structure generated and processed by design process 510 to produce a logically equivalent functional representation of a hardware device. Input design structure 520 may alternatively include data or program instructions that, when processed by design process 510, generate a functional representation of the physical structure of a hardware device. Whether representing functional or structural design features, input design structure 520 may be generated using electronic computer-aided design, such as that implemented by a core developer/designer. When encoded on a machine-readable or computer-readable data transmission, gate array, or storage medium, input design structure 520 may be accessed and processed by one or more hardware or software modules within design process 510 to simulate or otherwise functionally represent an electronic component, circuit, electronic or logic module, apparatus, device, or system such as those depicted in FIG. 1. As such, input design structure 520 may include files or other data structures including human or machine-readable source code, compiled structures, and computer-executable code structures that, when processed by a design or simulation data processing system, functionally simulate or otherwise represent circuits or other levels of hardware logic design. Such data structures may include hardware-description language design entities or other data structures conforming to or compatible with lower-level HDL design languages such as Verilog and VHDL, or higher level design languages such as C or C++.

Design process 510 preferably employs and incorporates hardware or software modules for synthesizing, translating, or otherwise processing a design/simulation functional equivalent of the components, circuits, devices, or logic structures depicted in FIG. 1, to generate a Netlist 560 which may contain design structures such as input design structure 520. Netlist 560 may comprise, for example, compiled or otherwise processed data structures representing a list of wires, discrete components, logic gates, control circuits, I/O devices, models, etc. that describe the connections to other elements and circuits in an integrated circuit design. Netlist 560 may be synthesized using an iterative process in which Netlist 560 is resynthesized one or more times depending on design specifications and parameters for the device. As with other design structure types described herein, Netlist 560 may be recorded on a machine-readable data storage medium or programmed into a programmable gate array. The medium may be a non-volatile storage medium such as a magnetic or optical disk drive, a programmable gate array, a compact flash, or other flash memory. Additionally, the medium may be a system or cache memory, buffer space, or electrically or optically conductive devices and materials on which data packets may be transmitted and intermediately stored via the internet, or other suitable networking means.

Design process 510 may include hardware and software modules for processing a variety of input data structure types including Netlist 560. Such data structure types may reside, for example, within library elements 530 and include a set of commonly used elements, circuits, and devices, including models, layouts, and symbolic representations, for a given manufacturing technology (e.g., different technology nodes, 22 nm, 14 nm, 10 nm, 7 nm, etc.). The data structure types may further include design specifications 540, characterization data 550, verification data 580, design rules 570, and test data files 585 which may include input test patterns, output test results, and other testing information. Design process 510 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 510, without deviating from the scope and spirit of the disclosure. Design process 510 may also include modules for performing standard circuit design processes such as timing analysis, verification, design rule checking, place and route operations, etc.

Design process 510 employs and incorporates logic and physical design tools such as HDL compilers and simulation model build tools to process input design structure 520 together with some or all of the depicted supporting data structures, along with any additional mechanical design or data, to generate a second design structure 590. Second design structure 590 resides on a storage medium or programmable gate array in a data format used for the exchange of data of mechanical devices and structures (e.g., information stored on an IGES, DXF, Parasolid XT, JT, DRG, or any other suitable format for storing or rendering such mechanical design structures). Similar to input design structure 520, second design structure 590 preferably comprises one or more files, data structures, or other computer-encoded data or instructions that reside on transmission or data storage media and that, when processed by an ECAD system, generate a logically or otherwise functionally equivalent form of one or more of the embodiments of the disclosure depicted in FIG. 1. In one embodiment, second design structure 590 may comprise a compiled, executable HDL simulation model that functionally simulates the devices depicted in FIG. 1.

Second design structure 590 may also employ a data format used for the exchange of layout data of integrated circuits and/or symbolic data format (e.g., information stored in a GDSII, GL1, OASIS, map files, or any other suitable format for storing such design data structures). Second design structure 590 may comprise information such as symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and depicted in FIG. 1. Second design structure 590 may then proceed to a state 595 where, for example, second design structure 590 proceeds to tape-out, is released to manufacturing, is released to a mask house, is sent to another design house, is sent back to the customer, etc.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A subtractor circuit fabricated within an integrated circuit (IC), the subtractor circuit configured to draw, using charge-scaling circuitry, a difference output node to a voltage proportional to a sum of two received N-bit binary numbers, the subtractor circuit comprising:
    a first set of N inputs configured to receive a first binary number having N bits, each input of the first set of N inputs indexed by an integer bit number "n" that corresponds to each input's respective significance, where n is in a range between and including 0 and N−1;
    a first sign input configured to receive a first sign bit corresponding to a sign of the first binary number;
    a first set of scaled capacitors that includes a true capacitor and a complement capacitor corresponding to each respective bit number n of the first binary number, each capacitor of the first set of scaled capacitors having an output terminal electrically connected to a difference output node and further having a capacitance value equal to $2^{(n)}$*a unit capacitance value ($C_{UNIT}$);
    a second set of N inputs configured to receive a second binary number having N bits, each input of the second set of N inputs indexed by an integer bit number "n" that corresponds to each input's respective significance, where n is in a range between and including 0 and N−1;
    a second sign input configured to receive a second sign bit corresponding to a sign of the second binary number;
    a second set of scaled capacitors that includes a true capacitor and a complement capacitor corresponding to each respective bit number n of the second binary number, each capacitor of the second set of scaled capacitors having an output terminal electrically connected to a difference output node and further having a capacitance value equal to $2^{(n)}*C_{UNIT}$;
    a control circuit electrically coupled to the first and second sets of N inputs and to the first and second sign inputs, the control circuit configured to:
        drive, in accordance with values of the N bits of the first binary number and a value of the first sign bit, input terminals of true capacitors and of complement capacitors of the first set of scaled capacitors to a first set of voltages representing a value of the first binary number; and
        drive, in accordance with values of the N bits of the second binary number and a value of the second sign bit, input terminals of true capacitors and of complement capacitors of the second set of scaled capacitors to a second set of voltages representing a value of the second binary number; and
    a reset circuit electrically connected to ground and to the difference output node, the reset circuit configured to draw, in conjunction with the control circuit and in response to receiving a reset signal, the difference output node to a reset voltage.

2. The subtractor circuit of claim 1, wherein the reset voltage is equal to one half of an IC supply voltage.

3. The subtractor circuit of claim 1, wherein the control circuit is configured to drive input terminals of the true capacitors and of the complement capacitors with buffer circuits.

4. The subtractor circuit of claim 3, wherein the scaled capacitors are selected from the group consisting of: Metal-Insulator-Metal (MIM) capacitors, metal-oxide semiconductor (MOS) capacitors, and deep trench (DT) capacitors.

5. The subtractor circuit of claim 1, wherein the reset circuit includes an N-channel field-effect transistor (NFET), a P-channel field-effect transistor (PFET) and a set of inverters configured to drive, in response to a received RESET input, the NFET and the PFET.

6. The subtractor circuit of claim 5, wherein the NFET, the PFET, and the set of inverters are electrically interconnected to provide, in conjunction with the control circuit, a reset voltage that is equal to one half of an IC supply voltage.

7. The subtractor circuit of claim 6, wherein the reset voltage of one half of the IC supply voltage corresponds to a numerical difference of 0 between the first binary number and the second binary number.

8. The subtractor circuit of claim 1, wherein the subtractor circuit receives binary numbers from digital logic circuits within the IC and drives, on the difference output node, an analog voltage representing the sum of received binary numbers to an analog-to-digital converter (ADC) within the IC.

9. The subtractor circuit of claim 1, wherein $C_{UNIT}$ is in a range between 2× and 10× an input capacitance of an ADC connected to the difference output node.

10. The subtractor circuit of claim 1, wherein an ADC electrically connected to the difference output node is selected from the group consisting of: a flash ADC, a resistor ladder ADC, a parallel comparator ADC, a successive-approximation ADC, and a counter type ADC.

11. The subtractor circuit of claim 1, wherein the voltage proportional to a sum of the two received N-bit binary numbers is within a voltage range corresponding to +/−1 least significant bit (LSB) of the two received N-bit binary numbers.

12. The subtractor circuit of claim 1, wherein an IC technology is selected from the group consisting of: complementary metal-oxide semiconductor (CMOS) and silicon on insulator (SOI).

13. A method of operating a subtractor circuit that uses charge-scaling to subtract, from a first N-bit binary number, a second N-bit binary number, the subtractor circuit fabricated within an integrated circuit (IC), the subtractor circuit comprising:
  a first set and a second set of N binary number inputs;
  first and second sign inputs corresponding to the first and the second set of N binary number inputs, respectively;
  a set of true scaled capacitors and a set of complement scaled capacitors, output terminals of the set of true scaled capacitors and of the set of complement scaled capacitors electrically connected to a difference output node; and
  a reset circuit configured to receive a reset input, the reset circuit electrically connected to the difference output node;
  the method comprising:
    resetting the subtractor circuit by:
      drawing, in response the first set and the second set of N binary number inputs and the first and second sign inputs each being asserted to a logical "0" value, input terminals of the sets of true and complement scaled capacitors to ground;
      drawing, in response to a reset input, the difference output node to ground with the reset circuit;
      drawing with the reset circuit, in response to the first sign input and the second set of N binary number inputs each being asserted to a logical "1", the difference output node to a reset voltage;
    receiving, with the first set of N binary number inputs, a first N-bit binary number;
    receiving, with a second set of N inputs, a second N-bit binary number; and
    drawing, in response to values of the first and of the second N-bit binary numbers, with the set of true scaled capacitors and with the set of complement scaled capacitors, the difference output node to an output voltage proportional to a sum of the first and second N-bit binary numbers.

14. The method of claim 13, wherein N is less than 5.

15. The method of claim 13, wherein the subtractor circuit fabricated within the IC is operated with an IC supply voltage in a range between 0.9 V and 1.1 V.

16. The method of claim 13, wherein a voltage of the difference output node is in a range between ground (GND) and an IC supply voltage.

17. The method of claim 13, wherein a smallest voltage increment of the voltage, proportional to a sum of the received N-bit binary numbers is greater than an operating voltage of an analog-to-digital converter (ADC) divided by 250.

18. The method of claim 13, further comprising converting to a binary number representing the sum of the first and second N-bit binary numbers, with an analog-to-digital converter (ADC) within the IC, the output voltage proportional to the sum of the first and second N-bit binary numbers.

19. The method of claim 13, wherein the subtractor circuit receives binary numbers from digital logic circuits within the IC and drives, on the difference output node, an analog voltage representing the sum of the received binary numbers to an analog-to-digital converter (ADC) within the IC.

20. A design structure embodied on a non-transitory computer-readable storage medium readable by a machine used in design, manufacture, and simulation of an integrated circuit (IC) subtractor circuit, the design structure comprising elements that, when processed in a semiconductor manufacturing facility, produce an IC including:
  a subtractor circuit configured to draw, using charge-scaling circuitry, a difference output node to a voltage proportional to a sum of two received N-bit binary numbers, the subtractor circuit comprising:
    a first set of N inputs configured to receive a first binary number having N bits, each input of the first set of N inputs indexed by an integer bit number "n" that corresponds to each input's respective significance, where n is in a range between and including 0 and N−1;
    a first sign input configured to receive a first sign bit corresponding to a sign of the first binary number;
    a first set of scaled capacitors that includes a true capacitor and a complement capacitor corresponding to each respective bit number n of the first binary number, each capacitor of the first set of scaled capacitors having an output terminal electrically connected to a difference output node and further having a capacitance value equal to $2^{(n)}*$a unit capacitance value ($C_{UNIT}$);
    a second set of N inputs configured to receive a second binary number having N bits, each input of the second set of N inputs indexed by an integer bit number "n" that corresponds to each input's respective significance, where n is in a range between and including 0 and N−1;
    a second sign input configured to receive a second sign bit corresponding to a sign of the second binary number;
    a second set of scaled capacitors that includes a true capacitor and a complement capacitor corresponding to each respective bit number n of the second binary number, each capacitor of the second set of scaled capacitors having an output terminal electrically connected to a difference output node and further having a capacitance value equal to $2^{(n)} * C_{UNIT}$;
- a control circuit electrically coupled to the first and second sets of N inputs and to the first and second sign inputs, the control circuit configured to:
  - drive, in accordance with values of the N bits of the first binary number and a value of the first sign bit, input terminals of true capacitors and of complement capacitors of the first set of scaled capacitors to a first set of voltages representing a value of the first binary number; and
  - drive, in accordance with values of the N bits of the second binary number and a value of the second sign bit, input terminals of true capacitors and of complement capacitors of the second set of scaled capacitors to a second set of voltages representing a value of the second binary number; and
- a reset circuit electrically connected to ground and to the difference output node, the reset circuit configured to draw, in conjunction with the control circuit and in response to receiving a reset signal, the difference output node to a reset voltage.

* * * * *